United States Patent

[11] 3,620,948

[72] Inventor Arthur Walsh
Rochester, N.Y.
[21] Appl. No. 764,718
[22] Filed Oct. 3, 1968
[45] Patented Nov. 16, 1971
[73] Assignee Xerox Corporation
Rochester, N.Y.

[54] PHOTOELECTROPHORETIC IMAGING SYSTEM EMPLOYING PRELIMINARY ELECTROPHORETIC DISPOSITION OF THE IMAGING SUSPENSION
14 Claims, 2 Drawing Figs.

[52] U.S. Cl........................................ 204/181,
96/1 R, 96/1 2, 96/1.3, 96/1.4, 204/180
[51] Int. Cl........................................ G03g 13/22

[50] Field of Search.................................... 204/181,
180; 96/1, 1.2, 1.3, 1.4

[56] References Cited
UNITED STATES PATENTS
3,384,566 5/1968 Clark.......................... 204/181
3,427,242 2/1969 Mihaylor.................... 204/300

Primary Examiner—George F. Lesmes
Assistant Examiner—John C. Cooper, III
Attorneys—James J. Ralabate, David C. Petre and Barry J. Kesselman ABSTRACT: An electrophoretic imaging process is disclosed whereby an useable positive image may be directly produced from negative input. The light-sensitive imaging suspension is electrophoretically introduced into the electrode configuration prior to light exposure in the presence of an electric field.

INVENTOR.
ARTHUR WALSH
BY
Donald C. Klosch
ATTORNEY

3,620,948

PHOTOELECTROPHORETIC IMAGING SYSTEM EMPLOYING PRELIMINARY ELECTROPHORETIC DISPOSITION OF THE IMAGING SUSPENSION

BACKGROUND OF THE INVENTION

This invention relates to an imaging system and more specifically to an electrophoretic imaging system.

In photoelectrophoretic imaging, colored photosensitive particles are suspended in an insulating carrier liquid. This suspension is placed between a pair of electrodes, subjected to a potential difference and exposed to an image to be reproduced. Ordinarily, in carrying out the process, the imaging suspension is placed on a transparent electrically conductive transparent plate in the form of a thin film and exposure is made through the transparent plate while a second generally cylindrically shaped electrode is rolled across the surface of the suspension. The particles are believed to bear an initial charge when suspended in the liquid carrier which causes them to be attracted to the transparent base electrode and, upon exposure, to change polarities by exchanging charge with the base electrode such that the exposed particles will migrate away from the base electrode to the roller electrode thereby forming images on both of the electrodes by particle subtraction, each image being complementary one to the other. The process may be used to produce both polychromatic and monochromatic images. In the latter instance a single color photoresponsive particle may be used in the suspension or a number of differently colored photoresponsive particles may be used in the suspension all of which respond to the same wavelength of light exposure. An extensive and detailed description of the photoelectrophoretic imaging techniques such as described above can be found in U.S. Pat. Nos. 3,384,565 and 3,384,566.

In the case of the polychromatic imaging process the imaging suspension will contain a plurality of at least two differently colored particles in a carrier liquid, each of said particles comprising an electrically photosensitive pigment whose principle light absorption band substantially coincides with its principle photosensitive response. Thus, the pigment represents both the primary electrically photosensitive ingredient and the primary colorant for the particular particle in suspension. The particles in the polychromatic system should preferably have intense pure colors and be highly photosensitive. It is preferred that the particles migrate with minimum exposure to activating electromagnetic radiation and that particles of each color migrate to an equal extent upon equal exposure to light of their complementary color. Where the particle mix is exposed to a multicolored image, particles migrate in proportion to the intensity of the light which they absorb. This migration should take place with a minimum of electrical interaction between particles of different colors. Thus, it is preferred and desired that particles selectively remain on one of the electrodes in image configuration with unwanted particles migrating to the other electrode in the system. For example, when a mixture comprising cyan, magenta and yellow particles is exposed to an image by yellow light, the cyan and magenta particles should migrate thus leaving behind an image made up of yellow particles. Similarly, when exposed to a multicolored image, different colored particles absorb light of their complementary color in appropriate image area and migrate leaving a full colored image corresponding to the original.

Although it has generally been found that good quality images can be produced, especially when a relatively insulating "blocking" surface is used as a part of the roller electrode in the system, due to the nature of the imaging suspension the image formed on the surface of the roller electrode not only contains pigment particles which have migrated to the respective surface in response to the impinging light source, but, in addition, due to the bipolarity properties of the pigments utilized in the system, also contains a goodly number of image-degrading charged pigment particles which inherently migrate to the roller electrode surface during the imaging-exposure phase of the process thereby contaminating the image formed on the roller electrode and making it unuseable. Thus, it has generally been necessary to form the desired image on the surface of the transparent electrode and then transfer this image to the surface of a receiving sheet. Thus, an optically and color negative input produces a useable optically and color negative image on the transparent electrode and an optically and color positive image produces a useable optically and color positive image on the transparent electrode. Therefore, the process as it is presently known has been found generally unsuitable for the formation, in a one-step system, of a positive image utilizing a color negative transparency as the input.

SUMMARY OF THE INVENTION

It is therefore an object of this invention to provide an imaging system which will overcome the above-noted disadvantages.

It is a further object of this invention to provide a high-quality electrophoretic imaging system.

Yet still a further object of this invention is to provide an electrophoretic imaging system capable of producing an optically and color positive image directly from an optically and color negative input.

Another object of this invention is to provide an improved one-step polychromatic imaging system.

The foregoing objects and others are accomplished in accordance with the present invention generally speaking by providing an imaging suspension of photoelectrophoretic imaging particles in an insulating carrier liquid. The imaging suspension is electrophoretically deposited onto the surface of an electrode which is at least partially transparent. Following the deposition of the imaging suspension onto the surface of the above-mentioned transparent electrode, the suspension is exposed selectively to an electromagnetic radiation source through the transparent electrode as an imaging roller is passed across the surface of the imaging suspension with a potential being applied across the imaging suspension concurrent with the exposure step. The imaging step maybe carried out with a negative transparency being projected onto the imaging suspension by way of the transparent electrode. The pigment image formed on the surface of the imaging roller is the complementary color of the light exposing the imaging suspension and therefore an image optically reversed from the input image is obtained directly.

Direct image color reversal has been lacking in the electrophoretic imaging systems presently known inasmuch as a number of undesirable pigment particles migrate to the surface of the imaging electrode along with the desired pigment particles to the extent of completely obscuring the final image. It has been determined in the course of the present invention that by initially applying the imaging suspension electrophoretically to the surface of the transparent electrode utilized in the system the unwanted particles are removed from the suspension. It is hypothesized that the imaging suspension is electrophoretically split to remove the above-mentioned image degrading particles which heretonow prevented the acceptable reproduction in a direct one step process of a positive image from a negative input or, vice versa, an optical or color negative from an optically positive color image input. Obviously, in producing a positive image directly on the roller electrode surface there is simultaneously produced a negative image on the surface of the transparent electrode. In other words the image on the transparent electrode optically matches the input while a usable image on the imaging electrode is color reversed or negative relative to the input. The viewing sense of the formed images may be right-reading or a mirror image depending from which side of the transparent electrode the image is viewed or whether or not a mirror is placed in the projection system. For example, the image viewed on the suspension side of the transparent electrode of Fig. 2 is wrong-reading but optically a color positive of the input projected. The image formed on the other electrode will be right-reading and a color negative of the input projected. To make both right-reading, peel off the surface of the imaging electrode with its image on it, and transfer the image on the transparent electrode to a transport sheet.

The electrophoretic imaging system of the present invention employs intensely colored pigment particles which serve both as the colorant and as the photosensitive material which apparently undergoes a net change in charge polarity upon exposure to activating radiation by interaction with one of the electrodes in the system. No additional photosensitive elements or materials are necessary thus providing a very simple and inexpensive imaging technique. In a monochromatic system a single colored photoresponsive particle may be used in the suspension of a number of differently colored photoresponsive particles may be used in the suspension all of which respond to the same wavelength of light exposure. As a result of a mixture of two or more differently colored particles each of which is sensitive only to light of a specific wavelength, the images are produced in a variety of colors. The particles respond in the regions of the spectrum of their principle light absorption with the cyan, magenta and yellow particles responding to red, green and blue light respectively. Thus this system is most suited to subtractive color synthesis.

BRIEF DESCRIPTION OF DRAWINGS

The invention is further illustrated in the accompanying drawings wherein.

DETAILED DESCRIPTION

Figure 1:
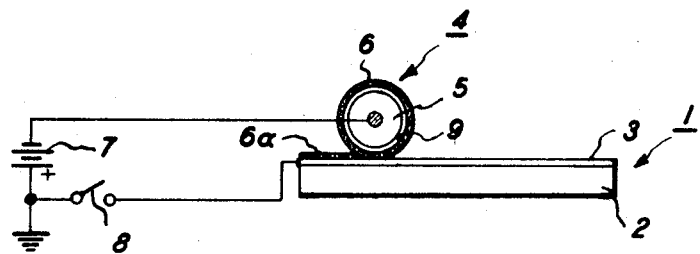
FIG. 1 represents a side sectional view of the initial phase of the process of the present invention whereby the imaging suspension is electrophoretically deposited onto the surface of the transparent electrode.
Figure 2:
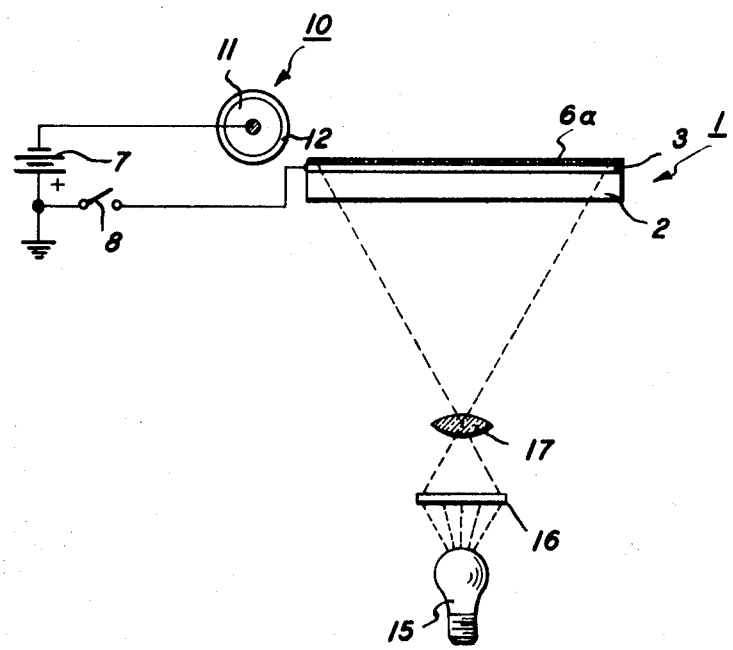
FIG. 2 represents a simple exemplary system for carrying out the imaging phase of the process herein described.

Referring now to FIG. 1 there is seen a transparent electrode generally designated 1 which in this exemplary instance is made up of a layer of optically transparent glass 2 overcoated with a thin transparent layer 3 of tin oxide. This configuration is commercially available under the trade name NESA glass. This electrode will hereinafter be referred to as the injecting electrode. A roller electrode 4, having coated on its surface a thin layer 6 of the imaging suspension of the present invention, is passed across the surface of the injecting electrode 1, the imaging suspension consisting of finely divided photosensitive particles dispersed in an insulating carrier liquid. During the description of the invention, the term "photosensitive" when used in reference to the particles in suspension may be thought of as being any particle which, once attracted to the injecting electrode will migrate away from it under the influence of an applied electric field when it is exposed to actinic electromagnetic radiation. The imaging suspension may also contain a sensitizer and/or binder for the pigment particles which is at least partially soluble in the suspending or carrier liquid. The roller electrode 4, comprising a conductive central core 5 and blocking layer 9, is connected to a power source 7 which in turn is connected to the injecting electrode 1 so that when switch 8 is closed an electric field is applied between electrodes 4 and 1 as the blocking electrode passes across the surface of the injecting electrode. With the potential of the roller 4 being fixed at a one polarity and the corresponding potential of the injecting electrode at the opposite polarity the imaging suspension 6 is electrophoretically deposited 6a, in the absence of light, onto the surface of the transparent electrode 1. Following the electrophoretic deposition of the imaging suspension on the surface of the injecting electrode the roller electrode 4 is replaced in the system by a second roller electrode as is represented in FIG. 2. The injecting electrode 1 of FIG. 2 now has coated on its surface a thin layer 6a of the imaging suspension electrophoretically deposited in the manner discussed in FIG. 1. Above the liquid imaging suspension 6a is passed an imaging roller electrode 10 which in this illustration is represented as a roller having a conductive central core 11 connected to power source 7. The core in this instance is covered with a layer of blocking electrode material 12. The opposite side of potential source 7 is connected to the injecting electrode as in the manner discussed in FIG. 1. Electrode 10 is also referred to as the blocking electrode. The pigment suspension is exposed by way of the projection mechanism made of light source 15, a color negative transparency 16, and a lens system 17. A potential is applied across the imaging and injecting electrodes upon the closing of switch 8. The imaging electrode 10 having a cylindrical configuration is rolled across the upper surface of the injecting electrode 1 supporting the imaging suspension 6a with switch 8 being closed during the period of image exposure. The light exposure causes exposed particles originally attracted to the injecting electrode 1 to migrate through the liquid carrier and adhere to the surface of the blocking electrode material 12 to produce an image complementary to that of the original input. The resulting thereat optically and color reversed image produced on the surface of the imaging electrode may then be fixed in place such as by placing a lamination over its surface or by virtue of a dissolved binder material initially present in the carrier liquid, such as a paraffin wax or other suitable binder, the latter coming out of solution as the liquid carrier evaporates. The blocking electrode layer 12 supporting the optically and color reversed image may then be unfastened and removed from the roller core 11 to be used as the final print. Thus, the process provides a direct one step system for producing optically and color reversed images from the input image, in this instance a multicolor print.

When used in the course of the present invention the term injecting electrode should be understood to mean that it is an electrode which will preferably be capable of exchanging charge with the photosensitive particles of the imaging suspension when the suspension is exposed to light so as to allow for a net change in the charge polarity of the particles. By the term blocking electrode is meant one which is capable of injecting electrons into and receiving electrons from the above-mentioned photosensitive particles at a negligible rate when the particles come into contact with the surface of the electrode. Obviously, if all the polarities in this system are reversed the function of the electrodes will also be reversed.

It is preferred that the injecting electrode be composed of an optically transparent material such as glass overcoated with a conductive material such as tin oxide, copper, copper iodide, gold or the like material; however, other suitable materials including many semiconductor materials such as raw cellophane, which are ordinarily not thought of as conductors but which are still capable of accepting injected charge carriers of the proper polarity under the influence of the applied field, may be used within the course of the present invention. The use of more conductive materials, however, allows for a cleaner charge separation and prevents possible charge buildup on the electrode which would tend to diminish the interior electrode field. The blocking electrode on the other hand is selected so as to prevent or greatly retard the injection of electrons into the photosensitive pigment particles when the particles reach the surface of this electrode. The blocking electrode base generally will consist of a material which is fairly high in electrical conductivity. Typical conductive materials are conductive rubber and metal foils such as steel, aluminum, copper and brass. Preferably the core of the blocking electrode will have a high electrical conductivity in order to establish the desired polarity differential. However, if a low-conductivity material is used a separate electrical connection may be made to the back of the blocking layer of the electrode. Although a blocking electrode need not necessarily be used in this system the use of such a layer is preferred because of the markedly improved results which it is capable of producing. It is preferred that the blocking layer when used be an insulator or a semiconductor which will not allow for the passage of sufficient charge carriers under the influence of an applied field so as to discharge the particles bound to its surface, thereby preventing particle oscillation within the system. Although the blocking electrode does allow for passage of some charge carriers it would still be considered to come within the class of preferred materials if it does not allow for the passage of sufficient charge carrier to recharge the particles to the opposite polarity. Exemplary of the preferred blocking layer material used are baryta paper, which consists of a paper coated with barium sulfate suspended in a gelatin solution, Tedlar, a polyvinyl fluoride, and polyurethane. Any other suitable material having a resistivity of from about $10^7$ohm-cm. or greater may be employed as the blocking electrode material. Typical materials in this resistivity range include cellulose acetate coated papers, polystyrene, polytetrafluoroethylene, and polyehyleneterephthalate. The baryta paper, Tedlar and the other materials used as the blocking layer may be wetted on the back surface with tap water or coated with an electrically conductive material. The blocking electrode layer, when utilized, may be separate replaceable layer which is either taped to the blocking electrode core or held by a suitable device such as mechanical fasteners which are capable of simply holding the layer on the electrode. In the alternative, the layer may be an integral part of the electrode itself, being either adhesively bonded, laminated, spray coated or otherwise applied to the surface of the electrode core. In the case of the present invention utilization of a separate replaceable layer is preferred.

Any suitable insulating carrier liquid may be used in the course of the present invention. Typical materials include decane, dodecane, and tetradecane, molten paraffin wax, molten beeswax and other molten thermoplastic materials, Sohio Odorless Solvent, a kerosene fraction commercially available from Standard Oil Company of Ohio and Isopar G, a long chain saturated aliphatic hydrocarbon commercially available from the Humble Oil Company of New Jersey and mixtures thereof.

A wide range of voltages may be applied between the electrodes in the system. For good image resolution, high image density and low background it is preferred that the potential applied be such as to create an electric field of at least about 300 volts across the imaging suspension. The applied potential necessary to attain this field of strength will, of course, vary depending upon the interelectrode gap and upon the thickness and type of blocking material used on the blocking electrode surface. For the very highest image qualities the optimum field is at least about 5,000 volts. The upper limit of field strength is limited only by the breakdown potential of the suspension and blocking material.

Other configurations may be used similar to that disclosed by the illustrations, and the roller configuration herein represented should be understood as merely being illustrative of the present invention. For example, the roller-type electrode could be represented in the form of a tractor device.

In the polychromatic system, the particles are selected so that those of different colors respond to different wavelengths in the visible spectrum corresponding to their principle absorption and further so that their spectral response curves do not have substantial overlap, thus allowing for color separation and subtractive multicolor image formation. Several different particles are employed namely a cyan colored particle sensitive mainly to red light, a magenta colored particle sensitive mainly to green light and a yellow colored particle sensitive mainly to blue light. While this is the simplest combination, additional particles having different absorption maxima may be added to improve color synthesis. When mixed together in the carrier liquid, these particles produced a substantially black liquid and when one or more of the particles are caused to migrate from the injecting electrode towards the blocking electrode they leave behind particles which produce a color equivalent to the color of the impinging light source. Thus, for example, red light exposure causes the cyan colored pigment to migrate thereby leaving behind the magenta and yellow pigments which combine to produce red in the final image. In the same manner, blue and green color light is reproduced by removal of yellow and magenta pigment respectively and, or course, when white light impinges upon the mix all pigment migrate leaving behind the color of the white or transparent substrate. No exposure leaves behind all pigments which combine to produce a black image. It should be recognized that this is an ideal technique of subtractive color imaging in that the particle's color component performs a dual function in that it acts both as the final image colorant and the photosensitive medium of the system. Accordingly, the system represents virtually the ultimate in eliminating the complexity of prior art methods of subtractive color imaging.

It is desirable to use pigment particles which are relatively small in size because smaller particles produce better and more stable pigment dispersions in the liquid carrier and in addition are capable of producing images of greater covering power and higher resolution than would be possible with particles of larger sizes. Even where the pigments are not commercially available in small particle sizes may be reduced by conventional techniques such as ball milling or the like.

The electrophoretic imaging particles when suspended in the liquid carrier generally take on a net electrostatic charge such that they may be attracted towards one of the electrodes in the system depending upon the polarity of the charge with respect to that of the respective electrode. Thus, the particles in the system generally are not restricted to taking on only one polarity of charge but instead the particles may be attracted to both electrodes. Some of the particles in the suspension initially move towards the injecting electrode while others move towards the blocking electrode and the effects of imagewise, exposure-induced migration is superimposed upon this particle migration. Thus, the apparent bipolarity of these suspensions causes a portion of the suspended particles to be removed from the system along with those particles which normally respond to the imagewise exposure. The effect of subtraction of those particles together with the radiation-responding particles substantially effects the quality of the image formed on the surface to which the particles have migrated so as to make it unuseable in its present form. By electrophoretically depositing the imaging suspension in the first instance in the absence of exposure radiation the image degradating pigment particles are selectively abstracted from the suspension so that they no longer present in the system to effect the resulting image produced on the imaging roller during the exposure phase of the process.

Any suitable different colored photosensitive pigment particles having the desired spectral responses such as disclosed in U.S. Pat. No. 3,384,488 may be used to form the pigment mix in the carrier liquid for color imaging. The photosensitive pigment may, for example, be polymeric in nature. The percentage of pigment in the insulating liquid carrier is not considered critical; however, for reference purposes, it is noted that from about 2 to about 10 percent pigment by weight has been found to produce desirable and acceptable results.

As previously stated, once the particle image is formed it may be fixed to the respective electrode such as by spraying a binder onto the surface, by laminating an overlay over the imaged surface or by including a binder in the liquid suspension medium. Generally, it will be found preferable to transfer the image from the electrode and fix it on a secondary surface so that the electrode may be reused. Such a transfer step may be carried out by an adhesive pickoff technique such as with adhesive tape or preferably by electrostatic field transfer. However, more desirable yet is to utilize a receptive sleevelike material on the blocking electrode which may simply be removed from the respective electrode following imaging.

Although various electrode spacings may be employed, spacings of less than about 1 mil and extending down to where the electrodes are substantially in virtual contact resulting from being pressed together are preferred. The latter condition constitutes a particularly preferred form of the invention in that there is produced the optimum image resolution and in view of the present invention the most noticeable improvement in color separation. This noted improvement is believed to take place as result of the high field strength across the suspension during imaging.

PREFERRED EMBODIMENTS

To further define the specifics of the present invention the following examples are intended to illustrate and not limit the subject matter of the present invention. Parts and percentages are by weight unless otherwise indicated.

All of the following examples are carried out in an apparatus of the general type illustrated in the figures with the imaging mix electrophoretically coated on a NESA glass substrate. The NESA glass surface is connected in series with a switch, a potential source, and the conductive center of the roller electrodes utilized. The roller is approximately 2 ½ inches in diameter and, except where specified, is moved across the plate surface at about 3 inches per second. The NESA plate employed is roughly 3 inches square and the imaging mix is exposed through the plate with a light intensity of about 100 foot candles. Exposure is made with a 3,200° K. lamp through a Kodacolor negative which is placed between the white light source and the NESA glass substrate.

EXAMPLE I

An imaging suspension comprising equal amounts of Watchung Red B, a barium salt of 1-(4'-methyl-5'-chloro-2'-sulfonic acid) azobenzene-2-hydroxy-3-naphthoic acid, C.I. No. 15,865, available from E. I. duPont de Nemours & Co., Monolite Fast Blue G.S., the alpha form of metal-free phthalocyanine, C.I. No. 74,100, available from Arnold Hoffman Company and a yellow pigment Algol Yellow G.C., 1,2,5,6-di(C,C'-diphenyl)-thiazole anthraquinone, C.I. No. 67,300, available from General Dyestuffs, in Sohio Solvent 3,440, a petroleum fraction available from Standard Oil of Ohio, is prepared with the total pigment constituting about 8 percent by weight of the suspension. These pigments are magenta, cyan, and yellow, respectively. The resulting mixture is coated on the surface of a first roller electrode and with a negative 3,000 volts applied to the roller, the trimix is electrophoretically deposited on a NESA glass substrate, in the absence of light. The coated NESA glass is then exposed as discussed above such that a colored image is projected onto the trimix as a second roller electrode moves across the surface of the NESA glass. A cellophane paper blocking electrode is employed and the roller is held at a negative potential of about 1,000 volts with respect to the NESA glass substrate. The image picked up on the paper surface consists of the complementary colors of the input, and an optically positive color image is obtained. The cellophane paper is then removed for the imaging roller.

EXAMPLE II

An imaging suspension comprising equal amounts of Bonadur Red B, 1-(4'-chloro-5'-ethyl-2' sulfonic acid) azobenzene-2-hydroxy-3-napthoic acid, available from American Cyanamide, Monolite Fast Blue G.S., the alpha form of metal-free phthalocyanine, C.I. No. 74,100, available from Arnold Hoffman Co. and a proprietary yellow pigment N-2''-pyridyl-8,13-dioxodinaphtoho-(2,1-6; 2', 3'-d) furan-6-carboxamide, more completely defined in U.S. Pat. application No. 421,281 filed Dec. 28, 1964 and having a common assignee, now U.S. Pat. No. 3,447,922, in Sohio Solvent 3,440 is prepared with the total pigment constituting about 8 percent by weight of the suspension. These pigments are magenta, cyan and yellow respectively. The resulting mixture is coated on the surface of a first roller electrode and with a negative 2,000 volts applied to the roller, the trimix is electrophoretically deposited on a NESA glass substrate in the absence of light. The coated NESA glass is then exposed as discussed above such that a colored image is projected onto the trimix as a second roller electrode moves across the surface of the NESA glass. A baryta paper blocking electrode is employed and this roller is held at a negative potential of about 1,200 volts, with respect to the NESA glass substrate. The image picked up on the baryta surface consists of the complementary colors of the input and an optically positive color image is obtained. The bartya paper is then removed from the imaging roller.

EXAMPLE III

The process of example II is repeated with the exception that the second imaging roller is moved across the plate surface at about 2 inches per second. Results similar to those obtained in example II are demonstrated.

EXAMPLE IV

The process of example I is repeated with the exception that the yellow pigment utilized in example II is substituted for the Algol Yellow of example I. The remaining steps of the process are the same. Similar results are obtained.

EXAMPLE V

The process of example IV is repeated with the exception that the voltage on the first roller electrode is a negative 3,000 volts and the voltage on the second roller electrode is a negative 750 volts.

EXAMPLE VI

The process of example I is repeated with the exception of the substitution of Tedlar for the cellophane paper on the blocking electrode. The remainder of the process remains the same. The color positive print is reproduced on the separable Tedlar substrate.

EXAMPLE VII

An imaging suspension comprising a metal-free phthalocyanine pigment, Monolite Fast Blue G.S., is prepared, 7 parts by weight of the photosensitive particles being dispersed in Sohio Odorless solvent 3,440. The pigment suspension is electrophoretically coated on a NESA glass substrate at a negative 2,500 volts and then exposed such that an image is projected onto the mix as a second imaging roller moves across the surface. A cellophane paper blocking electrode is utilized as the second roller with a negative potential of about 2,000 volts being developed. In this example with the use of only one pigment in the imaging suspension a direct positive monochrome image is produced.

Although the present examples are specific in terms of conditions and materials used any of the above-mentioned materials may be substituted when applicable with similar results being obtained. In addition to the steps used in the process of the present invention other steps or modifications may be used if desirable. For example, the system could also be adapted to direct positive to negative imaging if desired. In addition, other materials may be incorporated in the imaging suspension and the other facets of the invention which will enhance, synergize or otherwise desirably effect the properties therein desired. For example, various sensitizers may be utilized in conjunction with the imaging suspension.

Anyone skilled in the art will have other modifications occur to them based on the teachings of the present invention. These modifications are intended to be encompassed within the scope of this invention.

What is claimed is:

1. A method of photoelectrophoretic imaging comprising electrophoretically depositing an imaging suspension on the surface of a substantially transparent electrode, said suspension comprising a plurality of finely divided particles in a carrier liquid each of said particles comprising an electrically photosensitive pigment, said pigment being both the primary electrically photosensitive ingredient and the primary colorant for said particle, introducing at least one additional electrode, subjecting said suspension to an applied electric field between said electrodes, exposing said suspension to an image through said transparent electrode with a source of activating electromagnetic radiation whereby an image is formed.

2. The process as disclosed in claim 1 wherein said electrodes are spaced in virtual contact during exposure.

3. The process as disclosed in claim 1 further including the step of bringing said electrodes into virtual contact while exposing said suspension.

4. A method of photoelectrophoretic imaging comprising electrophoretically depositing an imaging suspension on the surface of a substantially transparent electrode, said suspension comprising a plurality of at least two differently colored finely divided particles in a carrier liquid, each of said particles comprising an electrically photosensitive pigment whose principal light absorption band substantially coincides with its principal photosensitive response, introducing at least one additional electrode, subjecting said suspension to an applied electric field between said electrodes, exposing said suspension to an image through said transparent electrode with a source of activating electromagnetic radiation whereby an image is formed.

5 An electrophoretic imaging process comprising electrophoretically depositing a layer of an imaging suspension on the surface of a substantially transparent electrode, said suspension comprising a plurality of finely divided particles in a substantially insulating carrier liquid each of said particles comprising an electrically photosensitive pigment which is both the primary electrically photosensitive ingredient and the primary colorant for said particle, introducing at least one additional electrode into the system, subjecting said layer of suspension to an applied electrical field between said electrodes while substantially simultaneously exposing said suspension to a light image through said transparent electrode thereby producing complementary pigment images on the surface of each of said electrodes.

6. The process as disclosed in claim 5 further including the step of bringing said electrodes together to a spacing of up to about 1 mil while exposing said suspension.

7. An electrophoretic imaging process comprising electrophoretically depositing a layer of imaging suspension on the surface of a substantially transparent electrode, said suspension comprising a plurality of at least two differently colored finely divided particles in a carrier liquid each of said particles comprising an electrically photosensitive pigment the principal light absorption band of which substantially coincides with its principal photosensitive response, introducing at least one additional electrode into the system, subjecting said layer of suspension to a light image through said transparent electrode, subjecting said layer of suspension to an applied electric field between said electrode thereby producing complementary pigment images on the surfaces of each of said electrodes.

8. An electrophoretic imaging process comprising electrophoretically depositing a layer of an imaging suspension on the surface of a substantially transparent electrode, said suspension comprising a plurality of finely divided particles in a substantially insulating carrier liquid each of said particles comprising an electrically photosensitive pigment which is both the primary electrically photosensitive ingredient and the primary colorant for said particle, said suspension including cyan colored particles principally photosensitive to red light, magenta colored particles principally photosensitive to green light and yellow colored particles which are principally photosensitive to blue light, providing at least one additional electrode for the system, subjecting said layer of suspension to an applied electrical field between said electrodes, exposing said suspension to a light image through said transparent electrode while sustaining said electrical field whereby an image is formed.

9. An electrophoretic imaging process comprising the steps of:
   electrophoretically depositing a layer of an imaging suspension on the surface of a first electrode, said suspension comprising a plurality of electrically photosensitive particles in an electrically insulating carrier,
   contacting the suspension on the surface of the electrode with at least another electrode,
   exposing said suspension to an image with activating electromagnetic radiation during contact with at least another electrode,
   applying an electrical field between said electrodes during imaging.

10. The process of claim 9 wherein the electrophoretic deposition is accomplished by depositing a layer of suspension on the first electrode and placing a removal electrode across the suspension to remove unwanted particles and applying an electrical field across the suspension between the first electrode and removal electrode whereby particles within the suspension are selectively removed from the first electrode.

11. The process of claim 9 wherein the electrophoretic deposition is accomplished by passing a suspension depositing electrode across the first electrode and applying an electrical field across the suspension whereby the suspension particles are selectively deposited electrophoretically on the first electrode.

12. The process of claim 9 wherein the electrophoretic deposition includes applying an electrical field across the suspension.

13. The process of claim 12 wherein the electrical field applied during electrophoretic deposition is of the same polarity as the polarity of the field applied during imaging.

14. The process of claim 13 wherein the electrical fields are such that the surface of the first electrode upon which the layer is electrophoretically deposited is positive relative to electrodes interfacing therewith during electrophoretic deposition and imaging.

* * * * *